United States Patent
Nguyen et al.

(10) Patent No.: US 7,290,578 B2
(45) Date of Patent: Nov. 6, 2007

(54) TIRE TREAD HAVING A TREAD BLOCK WITH AN UNDERCUT DESIGN

(75) Inventors: Gia-Van Nguyen, Rossignol (BE); Anne-France Gabrielle Jeanne-Marie Cambron, Angelsberg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 216 days.

(21) Appl. No.: 11/054,664

(22) Filed: Feb. 9, 2005

(65) Prior Publication Data
US 2006/0144492 A1 Jul. 6, 2006

Related U.S. Application Data

(60) Provisional application No. 60/640,678, filed on Dec. 30, 2004.

(51) Int. Cl.
*B60C 11/11* (2006.01)
*B60C 11/13* (2006.01)

(52) U.S. Cl. .................... 152/209.18; 152/209.21; 152/209.24; 152/902

(58) Field of Classification Search .......... 152/209.15, 152/209.18, 209.21, 209.24, 902
See application file for complete search history.

(56) References Cited

U.S. PATENT DOCUMENTS

| | | |
|---|---|---|
| 2,756,797 A | 7/1956 | Campbell |
| 2,819,751 A | 1/1958 | Frary et al. |
| 3,664,402 A | 5/1972 | Montagne |
| 4,779,656 A * | 10/1988 | Graas ................ 152/209.18 |
| 4,832,099 A | 5/1989 | Matsumoto |
| 5,308,416 A * | 5/1994 | Baumhofer et al. ........ 152/902 |
| 5,669,993 A * | 9/1997 | Moseley et al. ........... 152/902 |
| 5,769,977 A | 6/1998 | Masaoka |
| 5,924,464 A | 7/1999 | White |
| 6,012,499 A | 1/2000 | Masaoka |
| 6,408,910 B1 | 6/2002 | Lagnier et al. |
| 6,443,200 B1 | 9/2002 | Lopez |
| 6,571,844 B1 * | 6/2003 | Ochi et al. .............. 152/902 |
| 6,631,746 B2 | 10/2003 | Neumann |
| 6,786,257 B1 * | 9/2004 | Koide ................... 152/902 |
| 2002/0157749 A1 | 10/2002 | Neumann |
| 2003/0047262 A1 | 3/2003 | Kousaie et al. |
| 2006/0137792 A1* | 6/2006 | Emile Roesgen et al. .. 152/902 |

FOREIGN PATENT DOCUMENTS

| | | |
|---|---|---|
| EP | 0 751 013 | 1/1997 |
| EP | 1036674 | 9/2000 |
| EP | 1 070 606 | 1/2001 |
| JP | 11-286204 | * 10/1999 |

OTHER PUBLICATIONS

P. Vessiere (Examiner), European Search Report, dated Apr. 21, 2006, 7 pages, European Patent Office.

* cited by examiner

*Primary Examiner*—Steven D. Maki
(74) *Attorney, Agent, or Firm*—Wood, Herron & Evans, LLP

(57) ABSTRACT

The present invention provides for an improved tire tread having an improved hydroplaning resistance. Specifically, the tread includes one or more tread blocks having one or more walls with an undercut surface to deviate the flow of water from a circumferential groove(s) to a lateral groove(s), thereby providing for improved worn hydroplaning performance of tires.

11 Claims, 5 Drawing Sheets

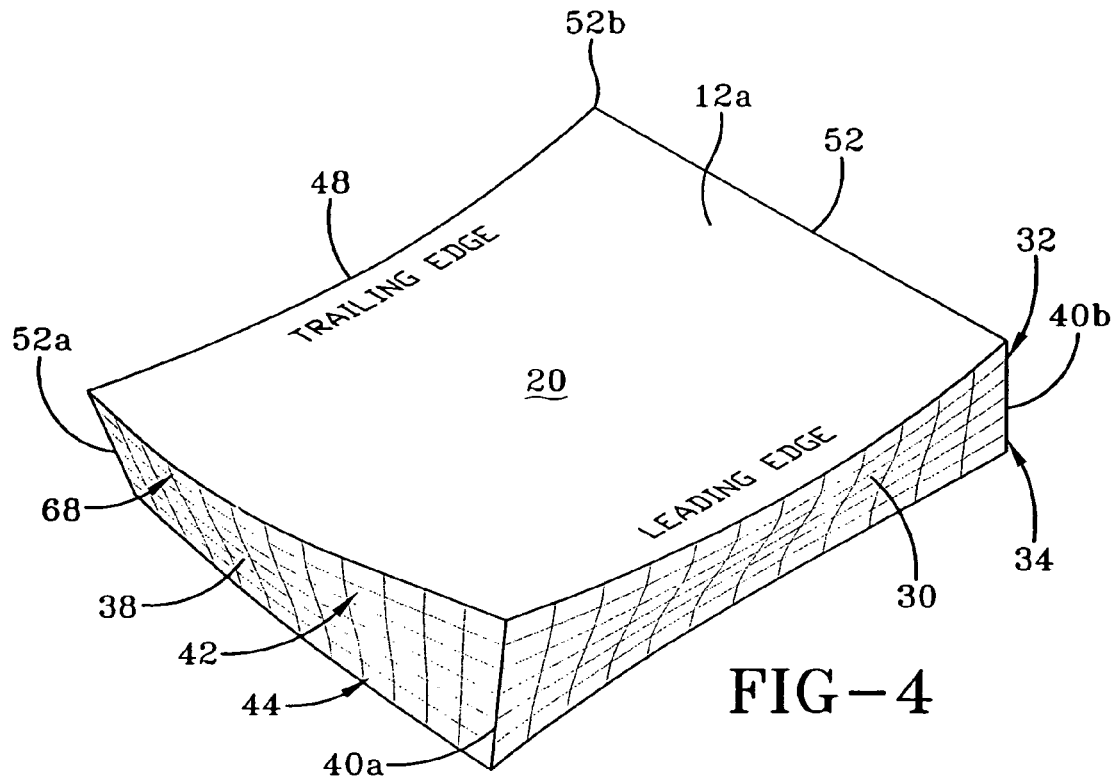
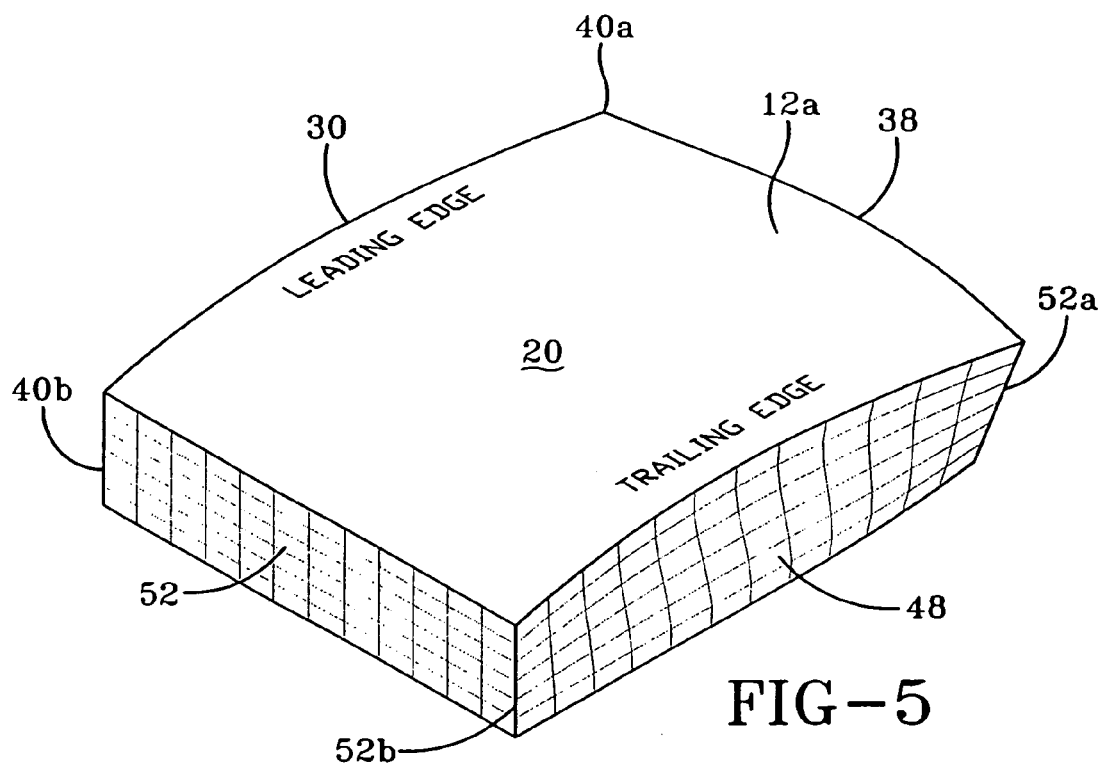

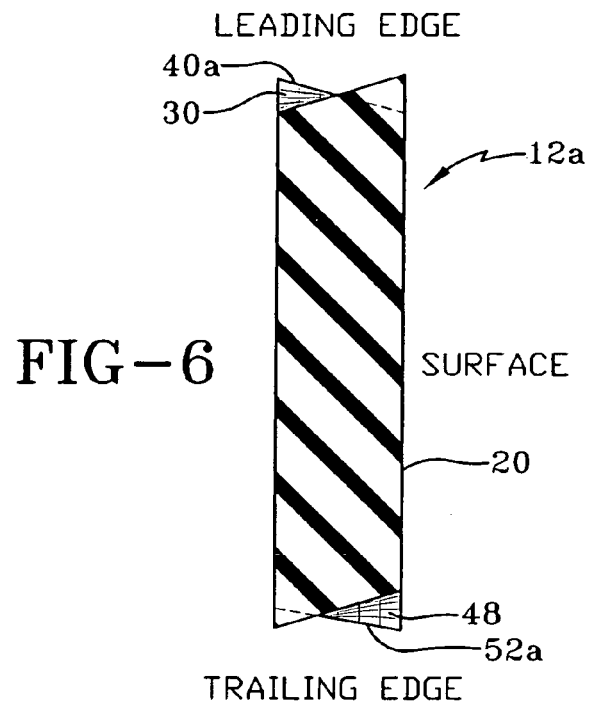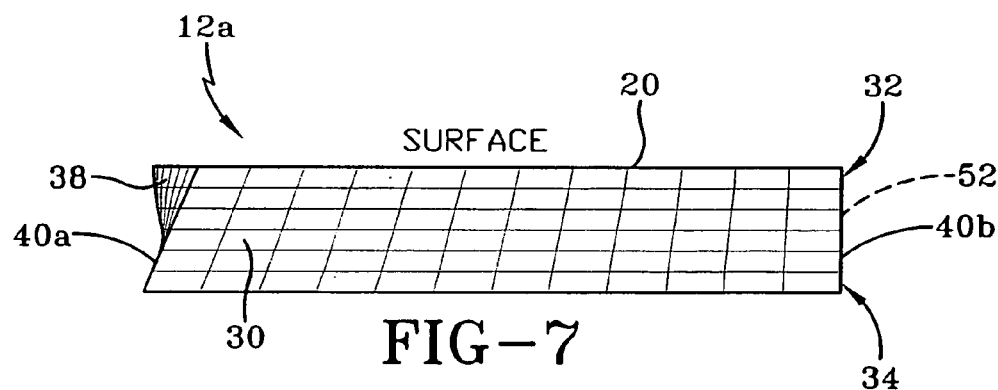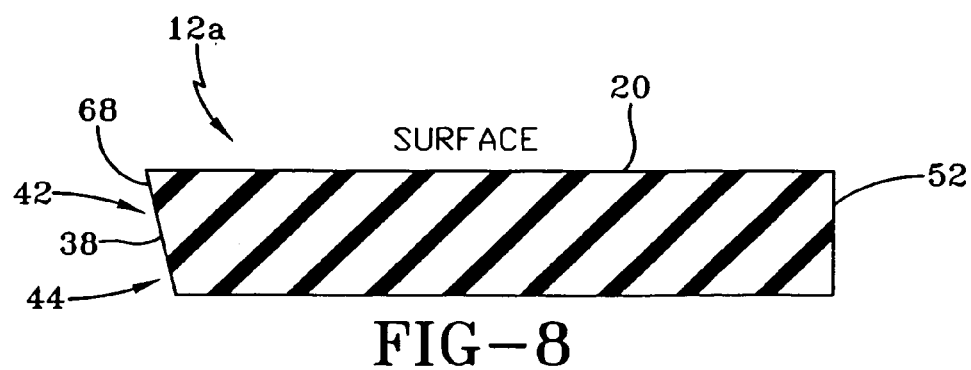

TIRE TREAD HAVING A TREAD BLOCK WITH AN UNDERCUT DESIGN

CROSS-REFERENCE TO RELATED APPLICATIONS

This application claims the benefit of and priority to prior filed co-pending U.S. Provisional Patent Application Ser. No. 60/640,678 to Nguyen et al., filed Dec. 30, 2004, entitled "Tire Tread Having A Tread Block With Undercut Design," which is hereby incorporated by reference herein in its entirety.

FIELD OF THE INVENTION

The present invention pertains generally to a tread for a pneumatic tire and, more particularly, to a tread having a pattern arrangement of tread blocks with one or more tread blocks having one or more walls with an undercut design to deviate the flow of water from a circumferential groove(s) to a lateral groove(s), thereby providing for improved worn hydroplaning performance of tires.

BACKGROUND OF THE INVENTION

As a conventional tire wears down its tread, the volume of the grooves between tread blocks is reduced, which can lead to poor hydroplaning performance. Conventional tires include a tread having a tread pattern that, when the tire is loaded, defines a footprint providing a frictional engagement with the road. The tread pattern is segmented into a plurality of raised blocks defined and separated by intersecting circumferential and lateral grooves. The grooves are necessary to provide flexibility and water removal, while the blocks determine the control, acceleration and braking characteristics of the tire. The circumferential grooves are positioned such that the raised blocks are arranged primarily in columns or ribs that extend circumferentially about the tire circumference.

The block dimensions, the number of ribs, and the inclination angle of the lateral grooves cooperate in determining the overall performance of the pneumatic tire. In particular, these factors determine the amount of tread that contacts the road, and hence the traction and control of the vehicle riding on the tires. The groove depth generally determines the ability of the intersecting circumferential and lateral grooves to channel water.

For a new tire, tread patterns are configured with compromises between various design parameters in order to optimize performance. As a tire wears, the parameter choices that optimized performance of the tire tread pattern in the unworn state may not be optimal at reduced groove depths. For example, a new tire construction may be designed with a tread pattern having raised blocks optimized for noise reduction and hydroplaning control. However, blocks that provide a balanced tire behavior in the new condition may not exhibit optimized noise reduction and hydroplaning control in a worn condition. Although the problem of noise created by contact between the road-contacting surfaces of the tread blocks and the road diminishes in a worn condition, current worn tires with conventional blocks are significantly more susceptible to hydroplaning than new tires.

For these and other reasons, it would be desirable to provide a tire tread with one or more tread blocks having one or more side walls with dimensions that address the deficiencies of conventional tire treads, in particular, worn hydroplaning performance.

SUMMARY OF THE INVENTION

The present invention provides for an improved tread pattern design having one or more tread blocks having one or more side walls having an undercut design to deviate the flow of water from a circumferential groove(s) to a lateral groove(s), thereby providing for improved worn hydroplaning performance of the tread.

One embodiment is directed towards a tire tread with one or more tread blocks having a first and a second side wall. The first side wall defines a leading edge having a new and worn region, is situated adjacent a lateral groove, and adjoined to the second side wall at a corner. The second side wall is situated adjacent a circumferential groove that intersects with the lateral groove. The circumferential groove defines a water channel disposed about the tire tread wherein water flows in a direction toward the leading edge and along the second side wall.

The new region of the leading edge of the tread block generally is defined as the first 30-60% of new tread of the tread block. This new region of the leading edge has a substantially obtuse angular orientation relative to the direction of water flow in the circumferential groove to limit water flow deviation from the circumferential groove into the lateral groove. In contrast, the worn region of the leading edge of the tread block has an acute angular orientation relative to the direction of water flow in the circumferential groove to permit water flow deviation from the circumferential groove into the lateral groove. This water flow deviation may be directed towards a tread shoulder or another circumferential groove, optionally oriented along an equatorial plane, so that water may be removed from the footprint of the tread, thereby providing for improved worn hydroplaning performance of the tread.

In an exemplary embodiment, the tire tread further includes a second tread block separated from the leading edge of the first tread block by the lateral groove. The second tread block includes a side wall having a new and worn region situated adjacent the circumferential groove. The new region of the second tread block also generally defines the first 30-60% of new tread of the tread block. The circumferential groove defines the water channel disposed about the tire tread wherein water flows in a direction along the side wall of the second block, and toward the leading edge, and along the second side wall of the first block. The worn region of the second tread block slopes inwardly along the direction of the water flow while the bottom portion of the leading edge includes the acute angular orientation relative to the direction of water flow in the circumferential groove to permit water flow deviation from the circumferential groove into the lateral groove.

In another embodiment, the new region of the leading edge further includes the substantially obtuse angular orientation relative to the direction of the water flow in the circumferential groove, and a portion of the new region of the side wall of the second tread block extends beyond the corner of the new region of the first tread block, to limit water flow deviation from the circumferential groove into the lateral groove.

By virtue of the foregoing, there is thus provided an improved tire tread having a pattern arrangement of tread blocks with one or more tread blocks having one or more walls with an undercut design to deviate the flow of water from a circumferential groove(s) to a lateral groove(s). The metamorphosis between new and worn tread conditions is produced primarily by changing the angular orientation of at least one side wall of one or more tread blocks relative to the direction of water flow in the circumferential groove.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 4 is a cross-sectional view of the tread block of FIG. 3 taken along lines 4-4;

FIG. 5 is a cross-sectional view of the tread block of FIG. 3 taken along lines 5-5;

FIG. 6 is a cross-sectional view of the tread block of FIG. 3 taken along lines 6-6;

FIG. 7 is a cross-sectional view of the tread block of FIG. 3 taken along lines 7-7; and FIG. 8 is a cross-sectional view of the tread block of FIG. 3 taken along lines 8-8.

DETAILED DESCRIPTION OF THE DRAWINGS

Figure 1:
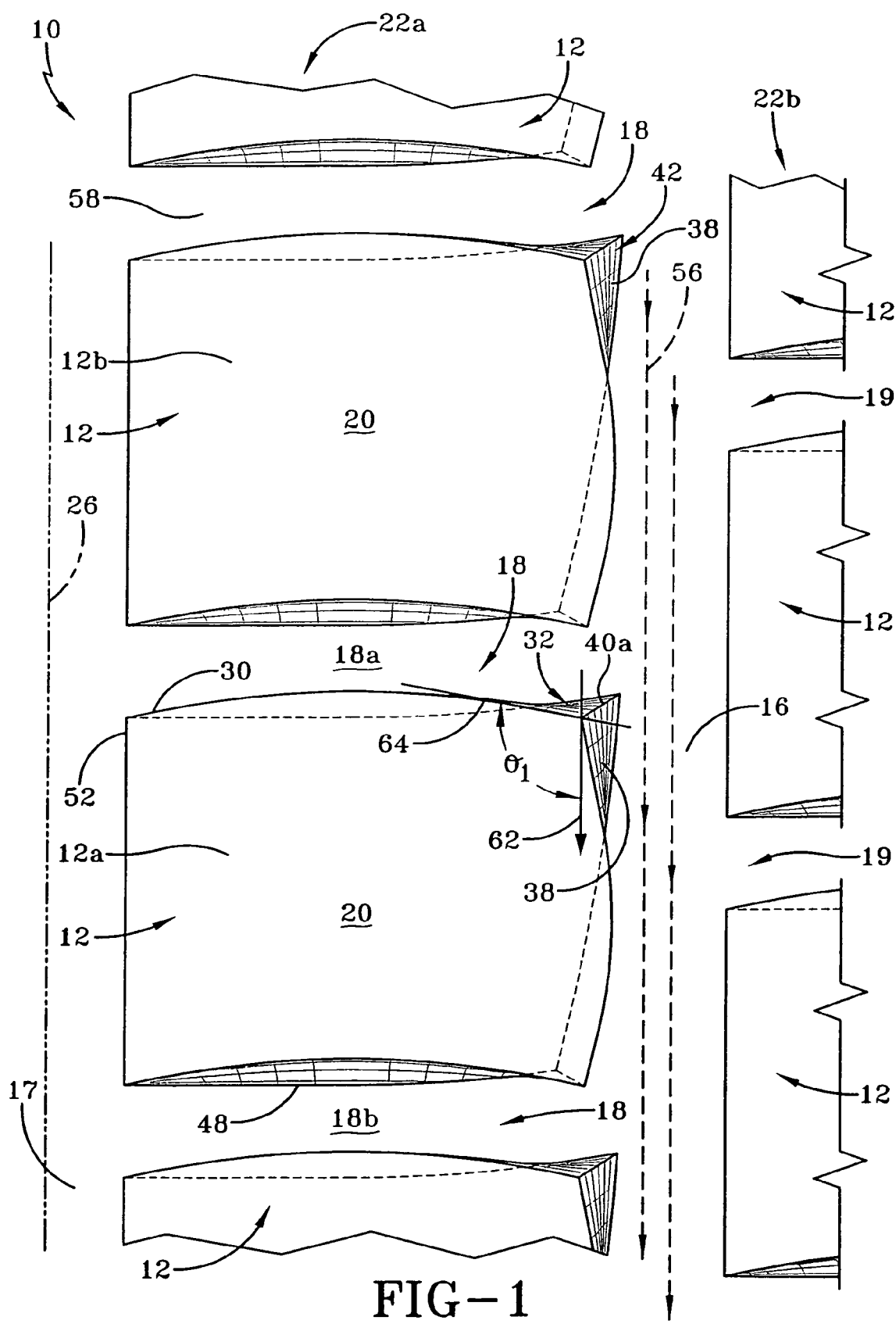
FIG. 1 is a fragmentary view of a tread with tread blocks in accordance with the present invention in which the tread is shown in a new or unworn condition.
Figure 2:
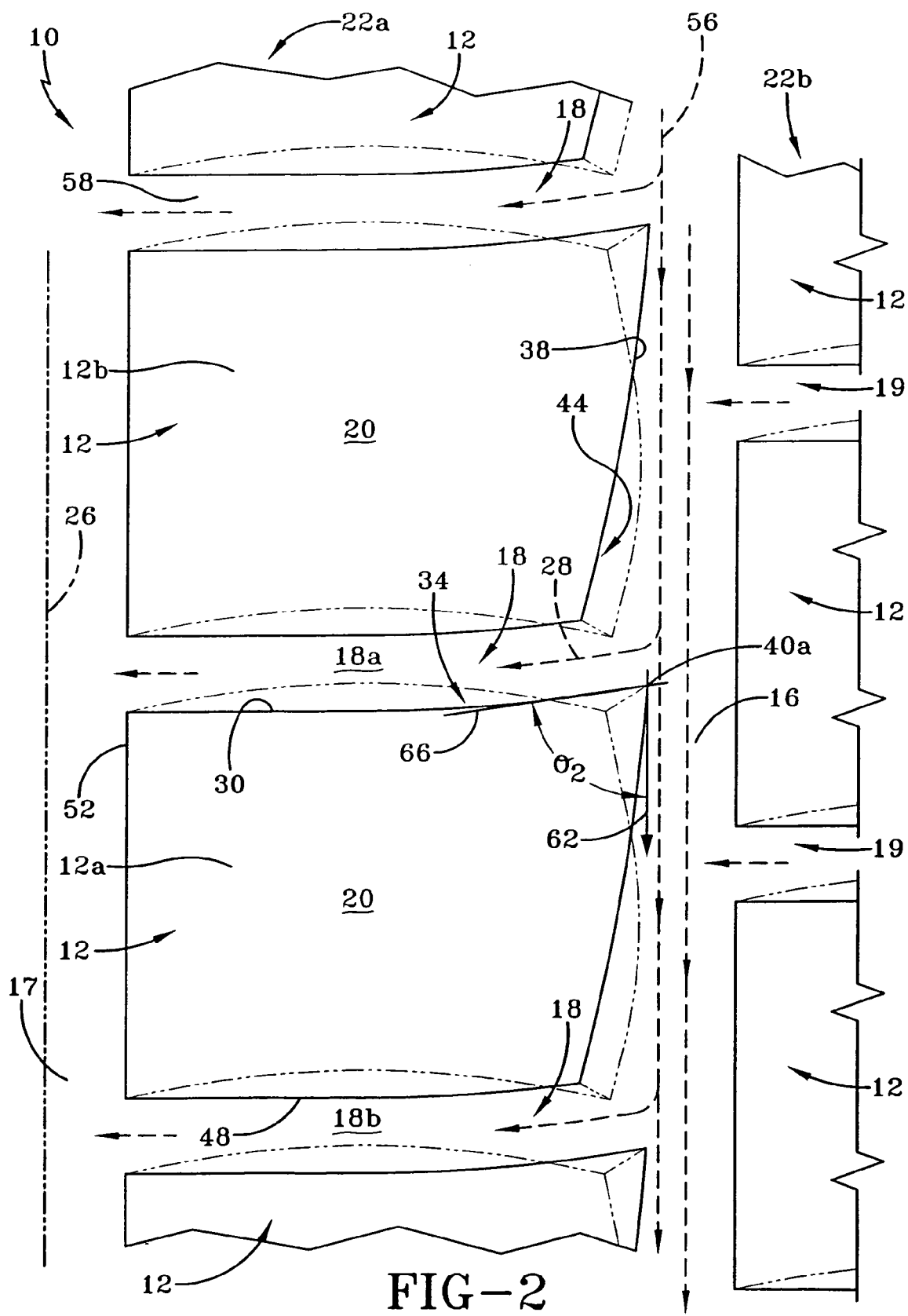
FIG. 2 is a fragmentary view of the tread of FIG. 1 in a worn condition.
Figure 3:
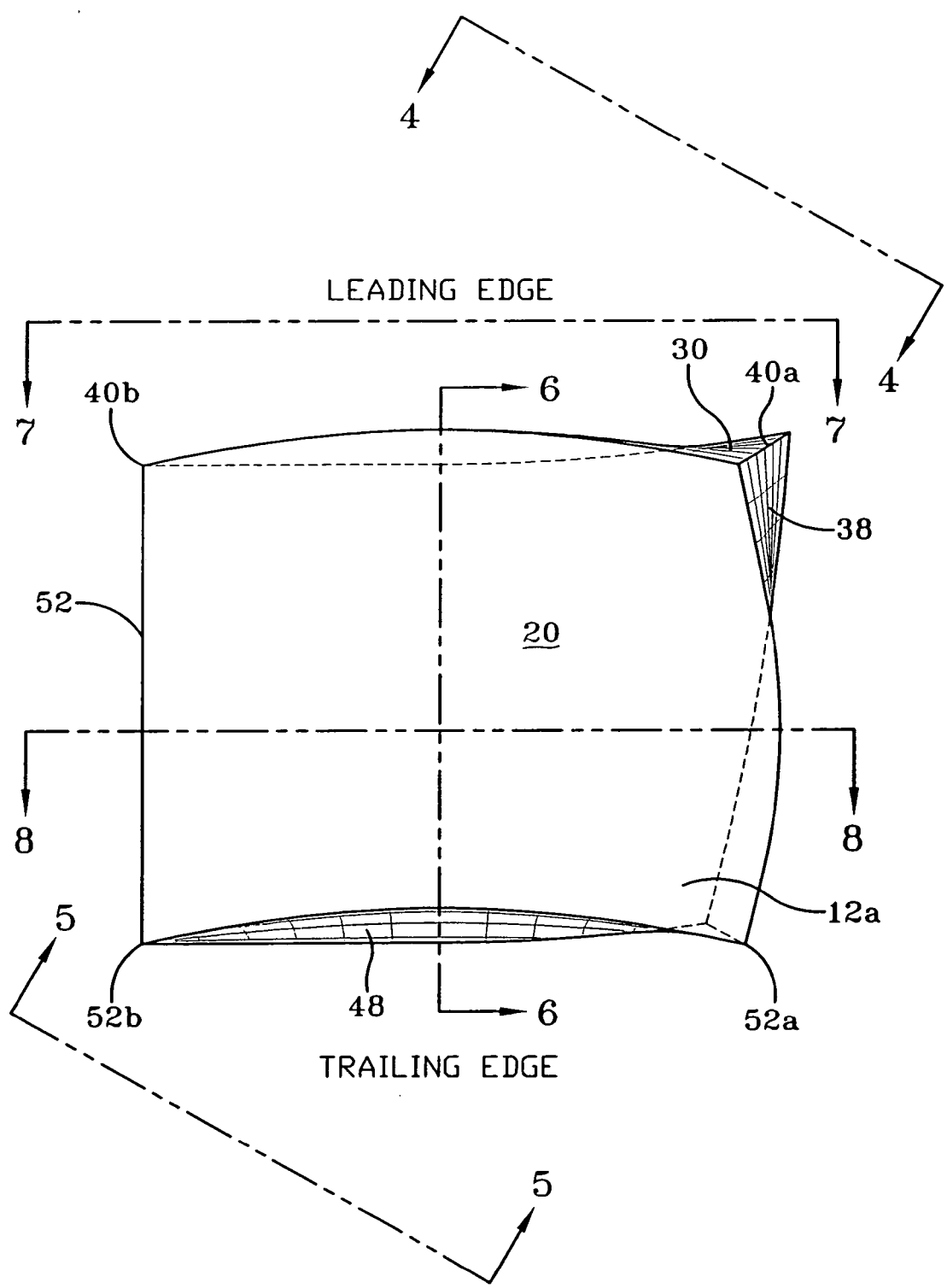
FIG. 3 is a top plan view of a tread block in accordance with an embodiment of the present invention.

As best shown in FIGS. 1 and 2, a tread 10 (shown in partial) is partitioned into a plurality of tread blocks 12 arranged in ribs 22a and 22b that extend circumferentially about the tread 10. The tread blocks 12 further are defined by intersections between continuous circumferential grooves 16 and 17 and a plurality of lateral grooves 18 and 19 formed into the tread 10. Accordingly, adjacent ribs 22a, 22b are separated from each other by the circumferential groove 16 while the tread blocks 12 are individually separated from adjacent blocks 12 in the same rib 22a, 22b, respectively, by the lateral grooves 18, 19.

The circumferential grooves 16, 17 and lateral grooves 18, 19 represent elongated void areas in the tread 10. Although only two circumferential grooves 16, 17 are shown, it is understood that more or less than shown may be provided within the tread 10 and may be provided in any number of locations within the tread, such as along an equatorial plane (not shown) or spaced therefrom, as illustrated herein. The tread 10 may be formed as a tread member for use in retreading a previously cured tire (not shown) or may be formed as the tread design directly on a green tire (not shown) as is commonly known in the art.

The tread blocks 12 project outwardly from the tread 10 and include a radially outermost, road-contacting surface 20 that contacts the road surface (not shown) as a tire rotates to define a footprint. The lateral grooves 18 extend between the circumferential grooves 16, 17 while the lateral grooves 19 similarly may extend between the circumferential groove 16 and another circumferential groove (not shown) of the tread 10. The tread 10 should be comprised of a suitable material, such as a natural or synthetic rubber compound, selected in accordance with engineering standards that are widely known in the art.

With further reference to FIGS. 1 and 2, first and second tread blocks 12a and 12b, separated by lateral groove 18a, are provided with an undercut design, as further described below. This undercut design allows for an increased water flow, i.e. permits water flow deviation represented by arrow 28 (FIG. 2), from the circumferential groove 16 to lateral groove 18a, in a direction towards shoulder 26, and eventually to circumferential groove 17. While first and second tread blocks 12a, 12b are shown as being identical, it should be understood by one skilled in the art that their dimensions may vary. It should be further understood that any number of tread blocks 12 may be provided on the tread 10 having one or more of the below described undercut designs to control water flow deviation from the circumferential groove 16 to one or more of the lateral grooves 18, 19.

Since the first and second tread blocks 12a, 12b are shown as being identical, the following description of the first tread block 12a is understood as applying equally to the second tread block 12b. Therefore, like reference numerals are used to identify like elements. Accordingly, as best shown in FIGS. 3-8, the first tread block 12a includes a first side wall 30 defining a leading edge and including a new and worn region 32 and 34. The new or unworn region 32 defines about the first 30-60%, advantageously about the first 40-50%, of new tread of the leading edge 30 of the tread block 12a. The leading edge 30 is situated adjacent lateral groove 18a (FIG. 1) and is adjoined to a second side wall 38 at a leading corner 40a. The second side wall 38 is situated adjacent the circumferential groove 16 which intersects with lateral groove 18a. The second side wall 38 also has a new and worn region 42 and 44. Similarly, the new region 42, as best shown in FIG. 4, defines about the first 30-60%, advantageously about the first 40-50%, of new tread of the second side wall 38.

With further reference to FIGS. 3-8, a third side wall 48 defines a trailing edge and is situated opposite the first side wall 30. This trailing edge 48 is situated adjacent lateral groove 18b (FIG. 1) and is adjoined to the second side wall 38 at a trailing corner 52a. The trailing edge 48 generally may be shaped to follow the contour, as further described below, of the leading edge 30. Opposite the second side wall 38 is a fourth side wall 52 situated adjacent circumferential groove 17. The fourth side wall 52 is adjoined to the leading edge 30 and trailing edge 48, respectively, at leading and trailing corners 40b and 50b. The fourth side wall 52 generally may be linear in shape. In addition, although the corners 40a, 40b, 52a, 52b of tread block 12a are shown as being linear, one or more may be rounded or radiused.

Referring again to FIGS. 1 and 2, the circumferential grooves 16, 17 define water channels disposed about the tire tread 10, and more specifically, circumferential groove 16 defines a water channel wherein water flows, as represented by arrow 56, in a direction from the leading edge 30, along the second side wall 38, toward the trailing edge 48 of respective tread blocks 12a, 12b during rotation of the tire (not shown) along the road surface (not shown). Notably, the orientation of the first and second side walls 30, 38 of the first and second tread blocks 12a, 12b changes relative to the direction of water flow 56 as a function of the position between the road-contacting surface 20 and a base surface 58 of the tread 10. In use, the tread blocks 12 and, consequently, the depth of the grooves 16, 18, 19 will diminish as the tread 10 wears. As the tread 10 wears, the road-contacting surface 20 is at a different resultant height above the base surface 58 and, hence, the first and second side walls 30, 38 have a different angular orientation, as described below.

As best shown in FIGS. 1 and 4, the new region 32 of the leading edge 30 of tread block 12a is configured to have a substantially obtuse angular orientation ($\theta_1$) relative to the direction of water flow 56 in the circumferential groove 16 to limit water flow deviation from the circumferential groove 16 into lateral groove 18a. More specifically, the new region 32 of the leading edge 30 defines the substantially obtuse angle ($\theta_1$) as measured from a line 62 parallel to the direction of water flow 56 in the circumferential groove 16 to a line 64 tangent to the leading edge 30 drawn from the leading corner 40a whereby the shape of the new region 32 limits water flow deviation from the circumferential groove 16 into the lateral groove 18a. The obtuse angle ($\theta_1$) advantageously is no greater than about 100°.

As best shown in FIGS. 2 and 6, the worn region 34 of the leading edge 30 of tread block 12a has a substantially acute angular orientation ($\theta_2$) relative to the direction of water flow 56 in the circumferential groove 16 to deviate water flow 28 from the circumferential groove 16 into lateral groove 18a. More specifically, the worn region 34 of the leading edge 30 defines the substantially acute angle ($\theta_2$) as measured from the line 62 parallel to the direction of water flow 56 in the circumferential groove 16 to a line 66 tangent to the leading edge 30 of the worn region 34 drawn from the leading corner 40a whereby the shape of the worn region 34 permits water flow deviation 28 from the circumferential groove 16 into lateral groove 18a. This water flow deviation 28 is directed towards the circumferential groove 17 and allows water to be removed from the footprint of the tread 10, thereby providing for improved worn hydroplaning performance of the tread 10. The acute angle ($\theta_2$) advantageously is no less than about 70°, more advantageously about 80°-85°. The change from the obtuse angular orientation ($\theta_1$) of the top portion 32 to the acute angular orientation ($\theta_2$) of the bottom portion 34 may be smooth or gradual, as shown, or sudden.

In addition to the changing configuration of the leading edge 30 of tread blocks 12a, 12b, the second side wall 38 is provided with an undercut design wherein worn region 44 slopes inwardly along the direction of water flow 56. Also, a portion 68 of the new region 42 of the second side wall 38 extends outwardly to help prevent water flow deviation, as further described below.

Ideally, the configuration of the second side wall 38 is coordinated with the leading edge 30 of an adjacent tread block 12. For example, as best shown in FIG. 1, the second side wall 38 of the second tread block 12b cooperates with the leading edge 30 of the first tread block 12a to control water flow deviation in the circumferential groove 16. More specifically, the portion 68 of the new region 42 of the second side wall 38 of the second tread block 12b extends beyond the leading corner 40a of the new region 32 of the first tread block 12a while the new region 32 of leading edge 30 includes the substantially obtuse angular orientation ($\theta_1$) relative to the direction of water flow 56 in the circumferential groove 16 to further limit water flow deviation from the circumferential groove 16 into lateral groove 18a. And, as best shown in FIGS. 2 and 4, the worn region 44 of the second side wall 38 of the second tread block 12b slopes inwardly along the direction of water flow 56 while the worn region 34 of the leading edge 30 of the first tread block 12a includes the acute angular orientation ($\theta_2$) relative to the direction of water flow 56 in the circumferential groove 16 to deviate water flow 28 from the circumferential groove 16 into lateral groove 18a.

Although water flow deviation has been shown and described herein as being in only one direction, i.e. towards shoulder 26 and circumferential groove 17, it should be understood by those skilled in the art that the direction of water flow 56 also may be deviated through lateral grooves 19, i.e. toward a circumferential groove (not shown) and shoulder (not shown), opposite the shoulder 26 of the tread, such as by providing one or more tread blocks 12 of rib 22b with a configuration mirroring that of tread block 12a. In addition, although the first and second tread blocks 12a, 12b are shown and described above as having more than one side wall 30, 38 with an undercut surface, it is understood that the first and/or second tread block 12a, 12b simply may be provided with only one undercut surface. As such, in one exemplary embodiment, only the orientation of the first side wall 30 of the first tread block 12a changes. In another exemplary embodiment, the orientation of the first side wall 30 of the first tread block 12a changes in cooperation with the second side wall 38 of the second tread block 12b to deviate water flow. Also, the tread 10 may include a large circumferential groove (not shown) oriented along an equatorial plane (not shown) with a pattern arrangement of tread blocks 12 on either side of the groove wherein one or more tread blocks 12 have one or more walls 30, 38, 48, 52 with an undercut design to deviate the flow of water to the groove to improve worn hydroplaning performance of a tire.

Notably, The lateral grooves 18 can transfer a substantially continuous flow of deviated water 28 laterally out of the footprint of the tread 10 for expulsion through the shoulder 26. As the tread 10 wears, a greater overall percentage of water in the circumferential groove 16 is being deviated to the lateral grooves 18. As a result, grooves 16, 17, 18 are more effective and efficient for expelling water out of the tire footprint for expulsion through the shoulder 26 when driving on wet roads. Hence, the tread 10 in the worn condition of FIG. 2 has an improved hydroplaning performance, as compared with current conventional treads.

Accordingly, there is thus provided the tread 10 of the present invention including one or more tread blocks 12 having an undercut design to deviate the flow of water from circumferential groove 16 to lateral groove 18, thereby providing the tread 10 with improved worn hydroplaning performance.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:
1. A tire tread, comprising:
a tread block having, a first sidewall, a second sidewall and an axially outer circumferentially extending sidewall, the first side wall defining a leading edge having an upper and lower region, the leading edge situated adjacent a lateral groove and adjoined to the second side wall at a corner, the second side wall having an upper and lower region and being undercut and situated adjacent a circumferential groove that intersects with the lateral groove, and the axially outer circumferentially extending side wall being linear in shape, the circumferential groove defining a water channel dis- posed about the tire tread wherein water flows in a direction toward the leading edge and along the second side wall, wherein the upper region of the leading edge defines an obtuse angle as measured from a line parallel to the flow of water in the circumferential groove to a line tangent to the leading edge of the upper region drawn from the corner thereof whereby the shape of the upper region limits water flow deviation from the circumferential groove into the lateral groove, wherein the lower region of the leading edge defines an acute angle as measured from the line parallel to the flow of water in the circumferential groove to a line tangent to the leading edge of the lower region drawn from the corner thereof whereby the shape of the lower region deviates water flow from the circumferential groove into the lateral groove.

2. The tread of claim 1 wherein the upper region defines the first 30-60% of the tread block.

3. The tread of claim 2 wherein the upper region defines the first 40-50% of the tread block.

4. The tread of claim 1 wherein the obtuse angle is no greater than about a 100° angle and wherein the acute angle is no less than about a 70° angle.

5. The tread of claim 1 wherein the tire tread includes a plurality of tread blocks.

6. A tire tread, comprising:

a first tread block having a first and a second side wall, and an axially outer circumferentially extending side wall the first side wall defining a leading edge having an upper and lower region, the leading edge situated adjacent a lateral groove and adjoined to the second side wall at a corner, the second side wall being undercut and situated adjacent a circumferential groove that intersects with the lateral groove;

a second tread block separated from the leading edge of the first tread block by the lateral groove, the second tread block including a first side wall and a second side wall, the second side wall having an upper and lower region situated adjacent the circumferential groove, the circumferential groove defining a water channel disposed about the tire tread wherein water flows in a direction along the second side wall of the second block toward the leading edge and second side wall of the first tread block, wherein the lower region of the leading edge forms an acute angle relative to the direction of water flow in the circumferential groove to deviate water flow from the circumferential groove into the lateral groove, wherein the upper region of the leading edge forms an obtuse angle relative to the direction of water flow in the circumferential groove to limit water flow deviation from the circumferential groove into the lateral groove, and wherein the axially outer circumferentially extending side wall of the first tread block is linear in shape.

7. The tread of claim 6 wherein a portion of the upper region of the second side wall of the second tread block extends beyond the corner of the upper region of the first tread block to limit water flow deviation from the circumferential groove into the lateral groove.

8. The tread of claim 6 wherein the obtuse angle is no greater than about a 100° angle and wherein the acute angle is no less than about a 70° angle.

9. The tread of claim 6 wherein a transition from the obtuse angle of the upper region to the acute angle of the lower region is gradual.

10. The tread of claim 6 wherein the upper region defines the first 30-60% of the tread block.

11. The tread of claim 10 wherein the upper region defines the first 40-50% of the tread block.

* * * * *